(12) United States Patent
Bernzen et al.

(10) Patent No.: US 8,275,519 B2
(45) Date of Patent: Sep. 25, 2012

(54) MOTOR VEHICLE HAVING A PREVENTATIVELY ACTING SAFETY SYSTEM

(75) Inventors: Werner Bernzen, Ehningen (DE); Dominic Reutter, Birenbach (DE); Alfred Wagner, Gomaringen (DE)

(73) Assignee: Daimler AG, Stuttgart (DE)

(*) Notice: Subject to any disclaimer, the term of this patent is extended or adjusted under 35 U.S.C. 154(b) by 925 days.

(21) Appl. No.: 11/631,647

(22) PCT Filed: Jul. 1, 2005

(86) PCT No.: PCT/EP2005/007110
§ 371 (c)(1),
(2), (4) Date: Mar. 6, 2008

(87) PCT Pub. No.: WO2006/005453
PCT Pub. Date: Jan. 19, 2006

(65) Prior Publication Data
US 2008/0319615 A1    Dec. 25, 2008

(30) Foreign Application Priority Data
Jul. 8, 2004 (DE) .......................... 10 2004 032 985

(51) Int. Cl.
*B60R 21/0132* (2006.01)
(52) U.S. Cl. ............................ 701/45; 180/282; 280/735
(58) Field of Classification Search .................... 701/45; 280/734, 735, 806; 180/268, 282, 271
See application file for complete search history.

(56) References Cited

U.S. PATENT DOCUMENTS

| | | | |
|---|---|---|---|
| 5,014,810 A | | 5/1991 | Mattes et al. |
| 5,173,614 A * | | 12/1992 | Woehrl et al. ................. 307/10.1 |
| 5,742,916 A * | | 4/1998 | Bischoff et al. ................. 701/45 |
| 6,198,387 B1 * | | 3/2001 | Dalum et al. ................. 340/436 |
| 6,305,709 B1 * | | 10/2001 | Okada ........................ 280/735 |
| 6,390,498 B1 * | | 5/2002 | Francis et al. ................. 280/735 |
| 6,397,127 B1 | | 5/2002 | Meyers et al. |
| 6,421,591 B1 | | 7/2002 | Hackenberg |
| 6,421,592 B1 * | | 7/2002 | Bargman et al. ................. 701/45 |
| 6,622,073 B2 | | 9/2003 | Tanaka et al. |
| 6,694,225 B2 * | | 2/2004 | Aga et al. ......................... 701/1 |
| 6,701,276 B2 * | | 3/2004 | Kueblbeck et al. ........... 702/145 |

(Continued)

FOREIGN PATENT DOCUMENTS
DE    39 24 507 A1    7/1989
(Continued)

OTHER PUBLICATIONS
European Office Action dated Mar. 2, 2009 (Five (5) pages).

*Primary Examiner* — Ruth Ilan
*Assistant Examiner* — Keith Frisby
(74) *Attorney, Agent, or Firm* — Crowell & Moring LLP

(57) ABSTRACT

A preventatively acting safety system for a motor vehicle comprises safety devices which are actuated as a function of information which is recorded by a driving situation detection device by means of a driving state sensor system and is evaluated in a data evaluation device. The recorded information are compared with at least one triggering threshold value and the safety devices being actuated when the triggering threshold value is exceeded. The triggering threshold value is adapted as a function of a total vehicle acceleration and a vehicle speed, to correspond to a degree of danger felt by a vehicle occupant.

8 Claims, 1 Drawing Sheet

U.S. PATENT DOCUMENTS

| | | | |
|---|---|---|---|
| 7,011,175 B2 * | 3/2006 | Link et al. | 180/274 |
| 7,079,928 B2 * | 7/2006 | Lu et al. | 701/38 |
| 2004/0073346 A1 | 4/2004 | Roelleke | |
| 2005/0080544 A1 * | 4/2005 | Suzuki et al. | 701/70 |
| 2005/0209757 A1 * | 9/2005 | Kueblbeck et al. | 701/46 |
| 2006/0058934 A1 * | 3/2006 | Le et al. | 701/38 |
| 2006/0076178 A1 | 4/2006 | Eberle et al. | |
| 2006/0164227 A1 | 7/2006 | Auer et al. | |
| 2006/0229783 A1 | 10/2006 | Lahmann et al. | |

FOREIGN PATENT DOCUMENTS

| | | |
|---|---|---|
| DE | 44 36 162 C1 | 10/1994 |
| DE | 197 29 960 A1 | 7/1997 |
| DE | 198 11 865 A1 | 3/1998 |
| DE | 198 30 835 A1 | 7/1998 |
| DE | 199 10 596 A1 | 3/1999 |
| DE | 101 21 386 C1 | 5/2001 |
| DE | 101 46 725 A1 | 9/2001 |
| DE | 101 49 112 A1 | 10/2001 |
| DE | 102 50 732 | 10/2002 |
| DE | 103 17 640 A1 | 4/2003 |
| DE | 102 46 917 A1 | 4/2004 |
| DE | 103 03 149 A1 | 7/2004 |
| EP | 1 247 699 A2 | 3/2002 |
| JP | 2002-127887 A | 5/2002 |
| WO | WO 02/20314 A1 | 3/2002 |
| WO | WO 02/087926 A2 | 11/2002 |
| WO | WO 03/097413 A1 * | 11/2003 |
| WO | WO 2004/069603 A1 | 8/2004 |
| WO | WO 2004/094195 | 11/2004 |
| WO | WO 2004/094195 A1 | 11/2004 |
| WO | WO 2006/005453 A1 | 1/2006 |

\* cited by examiner

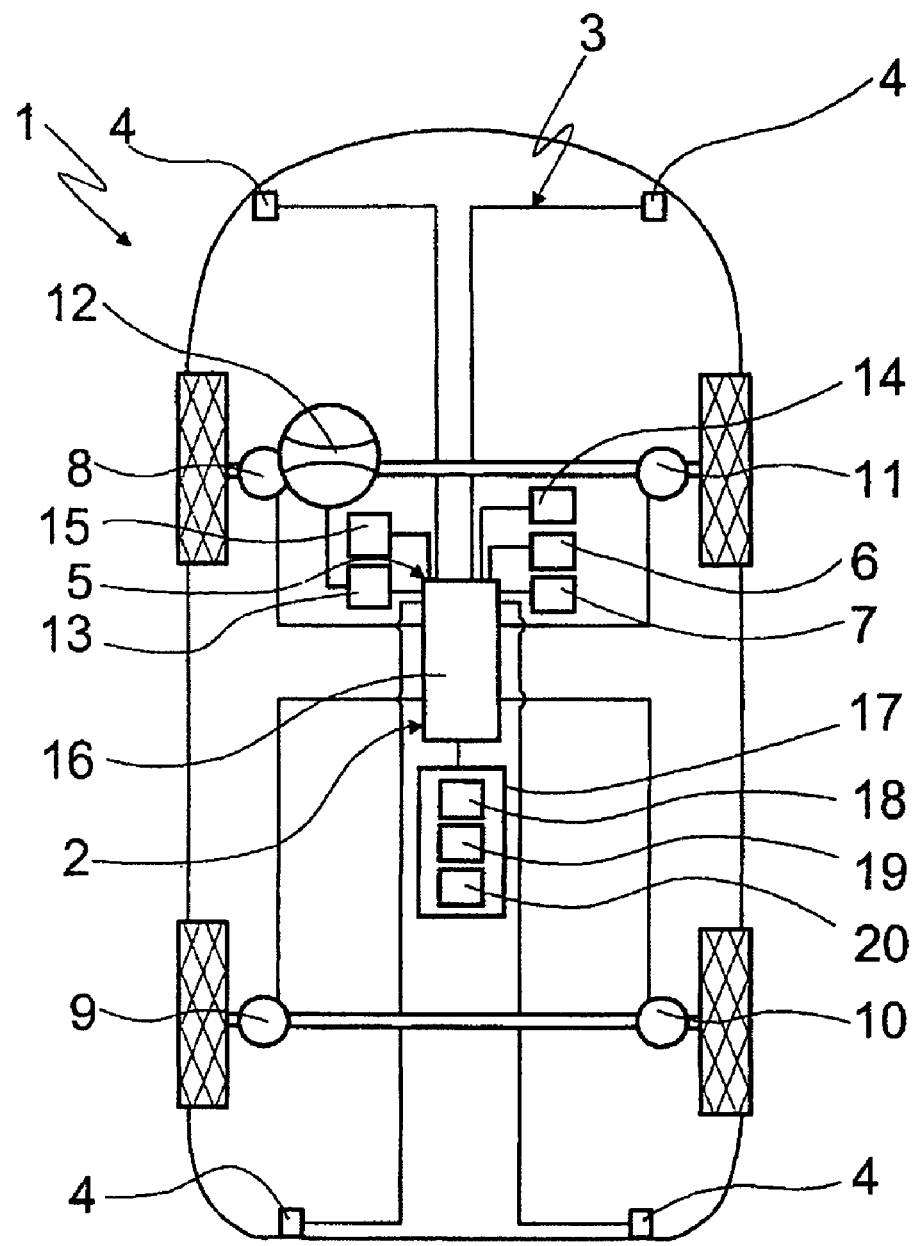

MOTOR VEHICLE HAVING A PREVENTATIVELY ACTING SAFETY SYSTEM

BACKGROUND AND SUMMARY OF THE INVENTION

This application claims the priority of German patent document 10 2004 032 985.0, filed Jul. 8, 2004 (PCT International Application No. PCT/EP2005/007110, filed Jul. 1, 2005), the disclosure of which is expressly incorporated by reference herein.

The invention relates to a motor vehicle having a preventatively acting safety system in which safety devices are activated based on an evaluation of a detected driving situation.

It is known to equip motor vehicles, such as passenger cars, with active and passive safety devices that allow the driver to better control his vehicle in critical situations, and thus to prevent the vehicle's possibly being involved in an accident. Safety devices of this type also help to reduce the severity of an accident in the event of a collision.

Safety systems which take preventative action even before a possible collision and use a so-called pre-crash phase (that is, a period of time starting from when detection systems in the vehicle detect a high probability of collision until the actual impact) to increase occupant protection by means of additional safety measures and thus reduce the severity of an accident, are known as preventatively acting safety systems. Safety systems of this type use information which is provided by various sensor devices of the motor vehicle to identify possible accident situations. Such sensor devices may include, for example, a constituent part of an electronic driving stabilizing program and/or a constituent part of a distance sensor system. Conclusions are then drawn about a possible impact on the basis of the identified situation, and corresponding measures are initiated to prepare the vehicle and occupant restraint systems for the imminent accident.

German patent document DE 101 21 386 C1 discloses a preventatively acting safety system in which driving state data are detected by means of a sensor system. A reversible occupant protection system can be activated and thus moved to the active position before a collision occurs. A safety system of this type is also called a PRE-SAFE system (registered trademark). A sensor system monitors the driving state data for any possible emergency braking, oversteering and understeering operations, and activates the occupant protection system if such condictions are detected at a time when a minimum speed is exceeded. The sensor system for detecting the driving state data may comprise a steering angle sensor, a pedal travel sensor, a brake pressure sensor, a wheel rotational speed sensor, an acceleration sensor and a yaw rate sensor.

The critical limit range is found to vary greatly in a subjective manner, depending on the speed at which the vehicle is traveling or the accelerations to which it is subjected. Therefore, understeer or oversteer is better tolerated at low speeds or low accelerations than at high speeds or accelerations in the longitudinal or lateral direction.

The occupant protection system known from German patent document DE 101 21 386 C1 is always activated at the same triggering threshold value, and therefore has a triggering behavior which is found to be subjectively sensitive at low vehicle speeds or accelerations and comparatively insensitive at high vehicle speeds or accelerations.

One object of the present invention is to provide a motor vehicle having a preventatively acting safety system of the type described above, which provides a triggering behavior of safety devices for occupants which is better matched to the current driving state and to the subjective sensing of driving-critical situations.

This and other objects and advantages are achieved by the preventatively acting safety system according to the invention, in which the triggering threshold value is adapted for a lateral dynamics-critical driving situation as a function of total vehicle acceleration and/or vehicle speed. The invention thus makes it possible to adapt the triggering behavior of an occupant and/or partner protection system which is in the form of a preventatively acting safety system, as a function of the coefficient of friction. It is possible, in particular, for the triggering thresholds to be applied separately for high and for low coefficients of friction.

The preventatively acting safety system according to the invention therefore means that the triggering threshold value which is associated with a lateral dynamics-critical driving situation, (e.g., a state of understeer or a state of oversteer) can be reduced in the case of a high coefficient of friction. This in turn increases the number of activations, particularly at high vehicle speeds, compared to a conventional preventatively acting safety system, and thus may possibly increase acceptance of the preventatively acting safety system by a user of the motor vehicle.

The preventatively acting safety system according to the invention, also makes it possible to adapt to the sense of danger felt by the vehicle user. The user generally feels safe at low vehicle speeds and low coefficients of friction, so that the triggering threshold value can assume a higher value. At high vehicle speeds and high coefficients of friction, the subjective sense of danger is generally more pronounced, so that the triggering threshold value then advantageously assumes a lower value.

The safety devices which are actuated when the triggering threshold value is exceeded may include, for example, a belt tensioning system, an airbag system, an electrical seat adjusting device, a cushion whose shape, size and/or position can be adjusted, or other vehicle components which can be adjusted electrically, hydraulically or pneumatically with a view to increasing safety.

The driving situation detection device may comprise a sensor system of various designs which is equipped, for example, with a steering angle sensor, a pedal travel sensor, a brake pressure sensor, a wheel rotational speed sensor, an acceleration sensor, a yaw rate sensor and/or a distance sensor.

The data evaluation device of the preventatively acting safety system according to the invention may be a data processing device of a driving stabilizing system of the motor vehicle which is often present in any case, particularly in modern motor vehicles. Alternatively, it is of course possible to employ a separate data processing device too.

In order to identify a lateral dynamics-critical driving situation (for example, "understeer", in which the radius of the desired path prescribed by the steering angle is less than the radius of the path actually traveled by the vehicle, or "oversteer", in which the radius of the desired path prescribed by the steering angle is greater than the radius of the path actually traveled), the total vehicle acceleration (which is found by adding the longitudinal and lateral vehicle acceleration determined by acceleration sensors and/or a yaw sensor) is expediently analyzed. If the analysis shows that the triggering threshold value which varies as a function of the coefficient of friction is exceeded, the data evaluation device outputs a collision plausibility, so that the safety devices which interact with the preventatively acting safety system can be activated and conditioned in accordance with the possible accident situation.

The preventatively acting safety system according to the invention preferably represents a reversible occupant protection system which can be moved from an initial state to an operative state and back from the operative state to its initial state again a number of times.

In one preferred embodiment of the invention, the triggering threshold value is dynamically adapted at least substantially continuously (that is, smoothly). It is therefore possible to adapt the triggering threshold value as a function of the coefficient of friction over the entire speed range of the motor vehicle.

Starting from a threshold value at a low vehicle speed and a low total vehicle acceleration (that is, in the case of a low coefficient of friction) it is expedient to reduce the triggering threshold value by up to approximately up to 50% as the vehicle speed and/or the total vehicle acceleration increase. This ensures that the preventatively acting safety system always responds in a manner which is matched to the driving situation.

Other objects, advantages and novel features of the present invention will become apparent from the following detailed description of the invention when considered in conjunction with the accompanying drawings.

BRIEF DESCRIPTION OF THE DRAWINGS

The single FIGURE in the drawing is a block diagram of one exemplary embodiment of a motor vehicle safety system according to the invention.

DETAILED DESCRIPTION OF THE DRAWINGS

The drawing shows a highly schematic plan view of a motor vehicle 1 which may be in the form of a passenger car or a commercial vehicle and is equipped with a preventatively acting safety system 2 which is designed according to the invention.

The preventatively acting safety system 2 has a safety sensor system 3 which interacts with a device 4 for identifying the vehicle surroundings, and a driving situation detection device 5. The driving situation detection device 5 is in turn provided with a driving state sensor system 6 which serves, inter alia, to identify oversteer and/or understeer of the motor vehicle 1. To this end, information or data is used which is supplied from, among other sources, wheel rotational speed sensors 8, 9, 10 and 11, a steering angle sensor 13 arranged in the region of a steering wheel 12, a longitudinal acceleration sensor 14 and a lateral acceleration sensor 15.

In this case, the driving state sensor system 6 also has an associated driving dynamics functionality 7 (for example an antilock brake system and/or an electronic stability program). To this end, the driving state sensor system 6 can analyze further important driving dynamics variables, such as vehicle speed, a yaw rate, spring compression and extension travel, the ride level of the vehicle, accelerator pedal movement, accelerator pedal position, brake pedal position, brake pedal movement, steering wheel speed and/or a steering wheel acceleration, during normal operation of the motor vehicle. This analysis involves comparing actual values of these variables with prescribed setpoint values and threshold values. For example, the antilock brake system and/or the electronic stability program, which assist the driver of the motor vehicle during driving-critical situations in order to avoid an accident, are activated on the basis of these comparisons.

The longitudinal and lateral accelerations determined by the sensors 14 and 15 and also the respective vehicle speed determined by the wheel rotational speed sensors 8 to 11, are evaluated in a data evaluation device 16. In particular, they are compared with a triggering threshold value for the purpose of utilizing and/or activating the preventatively acting safety system 2, with at least one selection of existing safety devices 17 being activated when the triggering threshold value is exceeded.

In the present case, the safety devices 17 may comprise a belt tensioning device 18, airbags 19 and an actuating system of an electrical seat adjusting device, it being possible to move the vehicle seats and/or their components, as a function of whether they are occupied, into a position which provides the vehicle occupant with the highest possible degree of safety in the event of an accident.

The triggering algorithm, which is stored in the data evaluation device 16, is formed such that the triggering threshold value of the preventatively acting safety system 2 is adapted as a function of a prevailing coefficient of friction (that is, as a function of a total vehicle acceleration, which is made up of the longitudinal and lateral acceleration values measured by means of the sensors 14 and 15), and the selected vehicle speed, in the event of a driving situation which is identified as being critical in terms of lateral dynamics.

In this case, the triggering threshold value is adapted substantially continuously. That is, it is reduced by up to 50% as the vehicle speed increases and as the total vehicle acceleration increases. This means that the preventatively acting safety system 2 and the safety devices 17 are activated from a relatively low triggering threshold value in the case of a high coefficient of friction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A preventatively acting vehicle safety system, wherein:
   safety devices are preventatively actuated as a function of information recorded by a driving situation detection device by means of a driving state sensor system;
   said information is evaluated in a data evaluation device, by comparing it with at least one triggering threshold value to identify a lateral dynamics-critical driving situation;
   the safety devices are preventatively actuated when the at least one triggering threshold value is exceeded;
   the at least one triggering threshold value is adjusted to account for the lateral dynamics-critical driving situation as a function of vehicle acceleration and a vehicle speed; and
   the vehicle acceleration is a total vehicle acceleration composed of longitudinal and lateral acceleration values, wherein the lateral dynamics-critical driving situation is an understeer or oversteer.

2. The preventatively acting vehicle safety system as claimed in claim 1, wherein the triggering threshold value is at least substantially continuously adapted.

3. The preventatively acting vehicle safety system as claimed in claim 1, wherein the triggering threshold value is reduced by up to approximately 50% as the vehicle speed increases and/or as the total vehicle acceleration increases.

4. A preventively acting vehicle safety system, comprising:
   driving situation detection means for recording information regarding a driving situation of a vehicle;

a data evaluation device which evaluates said information recorded by the driving situation detection means by comparing it with at least one triggering threshold value to identify a lateral dynamics-critical driving situation; and a plurality of safety devices which are actuated when the at least one triggering threshold value is exceeded;

wherein the data evaluation device executes a triggering algorithm so that the at least one triggering threshold value is adjusted to account for the lateral dynamics-critical driving situation as a function of vehicle acceleration and a vehicle speed, and the vehicle acceleration is a total vehicle acceleration composed of longitudinal and lateral acceleration values, wherein the lateral dynamics-critical driving situation is an understeer or oversteer.

5. The preventively active vehicle safety system according to claim 4, wherein the at least one threshold value is reduced by up to approximately 50% with at least one of increasing vehicle speed and increasing total vehicle acceleration.

6. A method for a motor vehicle with a driving state sensor system, data evaluation device and vehicle safety devices, the method comprising:

detecting, by the driving state sensor system, information regarding a vehicle operating situation;

evaluating, by the data evaluation device, the information by comparing it with at least one triggering threshold value to identify a lateral dynamics-critical driving situation; and actuating the vehicle safety devices when the at least one triggering threshold value is exceeded, wherein the at least one triggering threshold value is adjusted to account for the lateral dynamics-critical driving situation as a function of vehicle acceleration and a vehicle speed, and the vehicle acceleration is a total vehicle acceleration composed of longitudinal and lateral acceleration values, wherein the lateral dynamics-critical driving situation is an understeer or oversteer.

7. The method as claimed in claim 6, wherein the triggering threshold value is at least substantially continuously adapted.

8. The method as claimed in claim 6, wherein the triggering threshold value is reduced by up to approximately 50% as the vehicle speed increases or as the total vehicle acceleration increases.

* * * * *